MODULAR MEMORY STRUCTURES

Filed Jan. 12, 1961 3 Sheets-Sheet 1

INVENTORS
ALBERT H. MEDWIN &
EDUARD LUEDICKE
BY Morris ... Rabkin
Attorney

Dec. 15, 1964 A. H. MEDWIN ETAL 3,161,859

MODULAR MEMORY STRUCTURES

Filed Jan. 12, 1961 3 Sheets-Sheet 2

INVENTORS
ALBERT H. MEDWIN &
EDUARD LUEDICKE
BY
Morris L. Rabkin
Attorney

INVENTORS
ALBERT H. MEDWIN &
EDUARD LUEDICKE
BY
Attorney

United States Patent Office 3,161,859

Patented Dec. 15, 1964

3,161,859

MODULAR MEMORY STRUCTURES

Albert H. Medwin, Whippany, and Eduard Luedicke, Somerville, N.J., assignors to Radio Corporation of America, a corporation of Delaware Filed Jan. 12, 1961, Ser. No. 82,225
6 Claims. (Cl. 340—173)

This invention relates generally to modular structures, and more particularly to modular structures for a random access storage device. The modular structures of the present invention are particularly useful in computers that operate at relatively very high speeds.

Circuits designed to operate at very high frequencies, in the order of hundreds of megacycles (mc.), for example, require the use of interconnecting conductors of relatively short, predetermined lengths to prevent unwanted phase shifts. At a frequency of about 1000 mc./second, for example, a current wave travels about 4 inches in one nanosecond ($10^{-9}$ second). Also, these high frequency circuits require the interconnecting conductors to be transmission lines of a desired characteristic impedance for proper operating conditions. At these very high frequencies, the dimensions of a conductor, its shielding, its insulation, and its position in the circuit are critical if unwanted phase shifts are to be prevented.

It has been proposed to interconnect components in high frequency circuits with shielded cables of the coaxial type. The use of these relatively bulky transmission lines for interconnecting small, high frequency circuit components is, however, somewhat unwieldy. This is especially true in a random access storage device employing two sets of transmission lines and a number of components interconnecting the transmission lines at address points. Where a relatively high number of bits of information is to be stored in a computer memory at the speeds described, the use of conventional coaxial cables and conventional circuitry techniques are quite difficult, if not impossible.

Accordingly, it is an object of the present invention to provide novel modular structures employing two sets of transmission lines arranged in a manner to expose conductors of the transmission lines to components for easily accessible and substantially direct connections thereto.

Another object of the present invention is to provide a novel random access storage device arranged as a modular structure to provide a relatively high number of bits of information per unit volume and to permit high speed operation.

A further object of the present invention is to provide novel modular structures that are relatively simple in construction, economical of space, and highly efficient in use in high speed computers.

In accordance with the present invention, the novel modular structures comprise, in their simplest embodiment, a stack of three sheets of insulating material. The bottom sheet, so called arbitrarily for purposes of identification and orientation of the other sheets with respect thereto, has one side covered with an electrically conductive film, and the other side covered with a series of regularly spaced, substantially parallel, electrically conductive lines. The midde sheet of the stack has its upper surface covered with an electrically conductive film; and the top sheet of the stack has, on its upper surface, a plurality of regularly spaced, substantially parallel, electrically conductive lines that are disposed transversey with respect to the lines on the bottom sheet. The middle and top sheets are formed with a plurality of regularly spaced, substantially parallel slots in communicative alignment with each other. These aligned slots are formed between the lines on the top sheet and serve to expose portions of the lines on the bottom sheet so that components may be easily connected thereto. Each of the lines on the upper surface of the bottom sheet forms, with the film on the lower surface of the bottom sheet, a transmission line, that is, an X address line of a desired characteristic impedance. Likewise, the lines on the top sheet form, with the film on the middle sheet, transmission lines, that is, Y address lines of a desired characteristic impedance.

In another embodiment of the present invention, a component-positioning sheet of insulating material, formed with a plurality of substantially similar openings, is disposed over the aforementioned stack of sheets. In this modular structure, components, such as resistors and tunnel diodes, for example, may be positioned snugly within the openings of the component-positioning sheet and also in the aligned slots in the top and middle sheets of the stack for direct connections to address points on the X and Y address lines. The upper surface of the component-positioning sheet may be covered with a conductive film to form a part of the circuitry of the random access storage device. An output sheet of insulating material may be disposed over the component-positioning sheet so that it rests on certain ones of the aforementioned components. The upper surface of the output sheet may have thereon an electrically conductive film so as to form a capacitor with portions of some of the components in the modular structure.

The novel features of the present invention, both as to its organization and method of operation, as well as additional objects and advantages thereof, will be more readily understood from the following description, when read in connection with the accompanying drawings in which the same reference characters designate similar parts, and in which.

Figure 1:
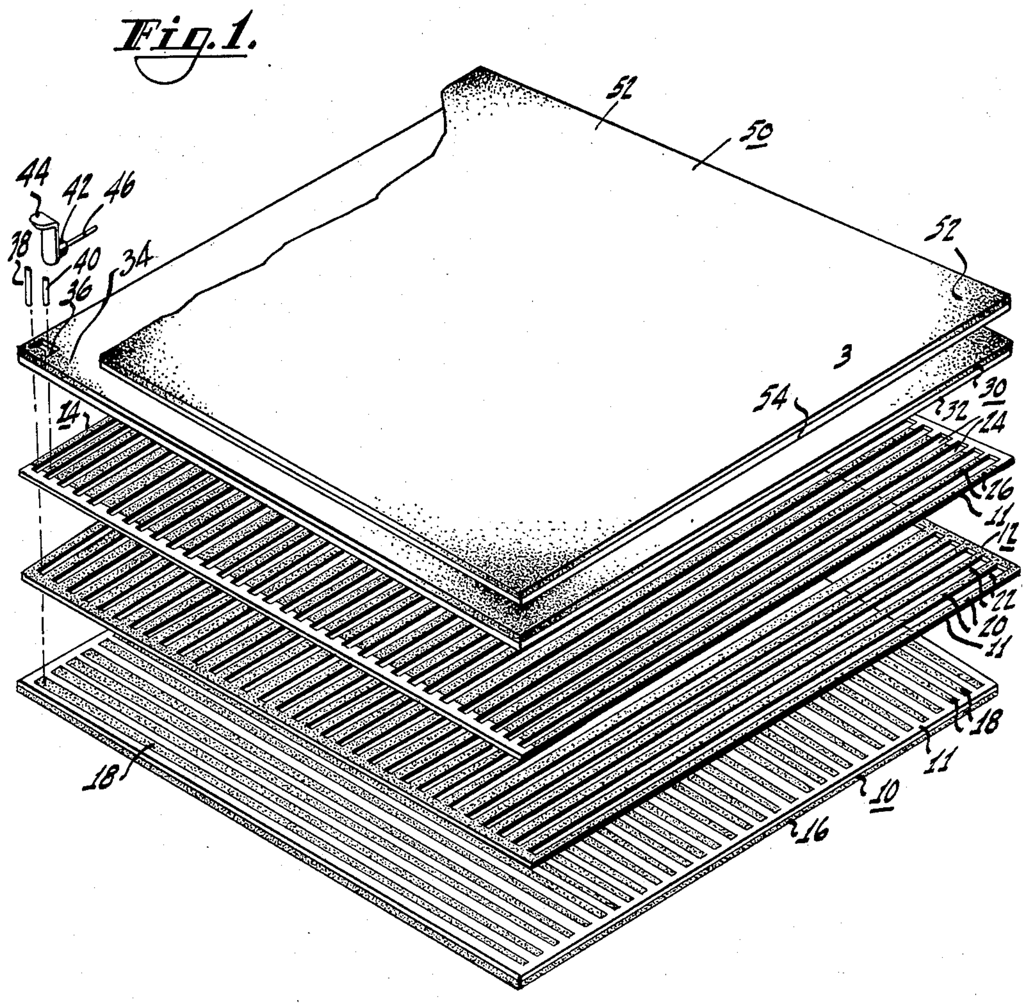
FIG. 1 is an exploded, perspective view of a modular structure for a random access storage device in accordance with the present invention.
Figure 4:
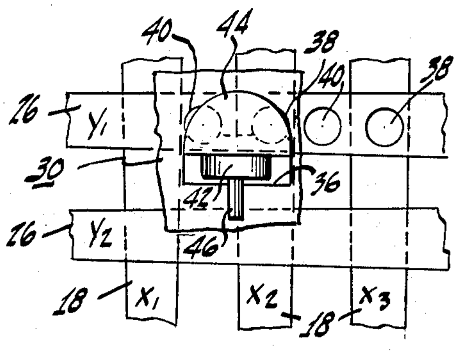
Figure 5:
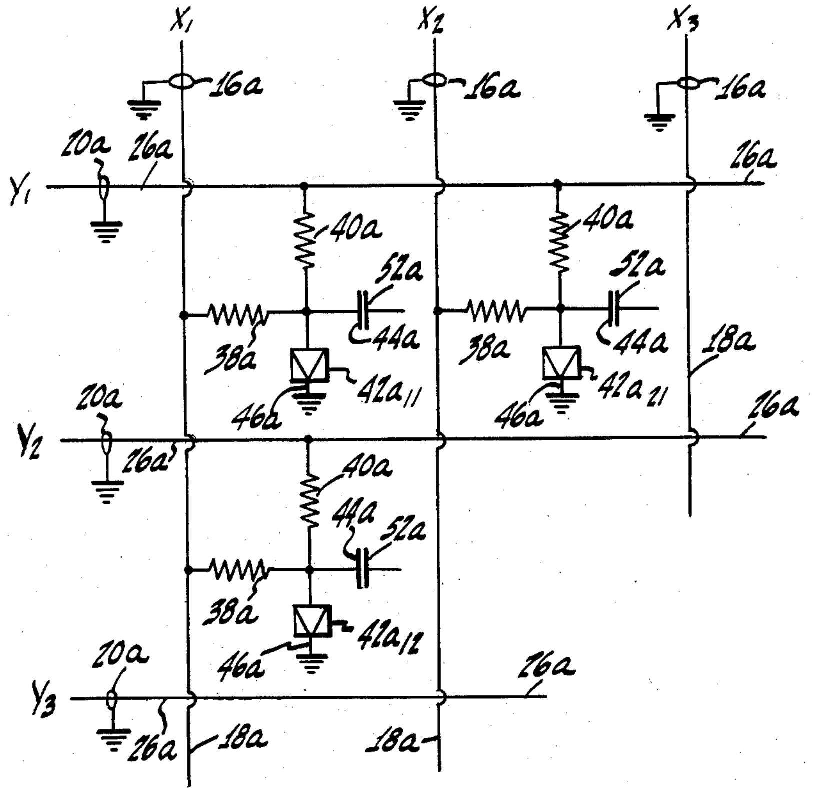

FIG. 4 is a fragmentary, plan view of a set of components within an opening in the component-positioning sheet, showing the physical relationship of the components with respect to the address lines of the random access storage device shown in FIG. 1; and FIG. 5 is a schematic diagram of a portion of the circuitry of an embodiment of a random access storage device for a modular structure of the present invention.

Figure 2:
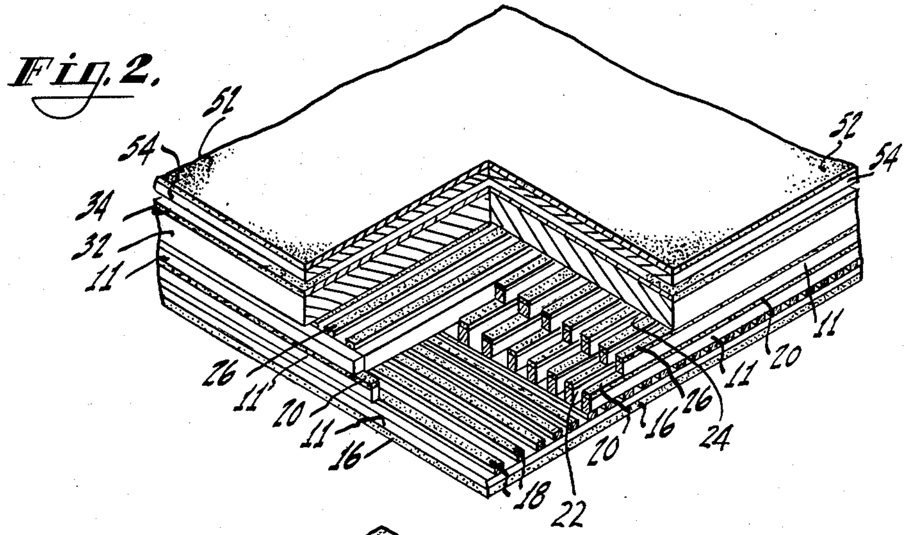
FIG. 2 is a fragmentary, perspective view, with portions in cross-section, of the modular structure illustrated in FIG. 1.

Referring, now, particularly to FIGS. 1 and 2 of the drawing, there is shown a modular structure for a random access storage device comprising a bottom sheet 10, a middle sheet 12, and a top sheet 14. The sheets 10, 12 and 14 are designated herein as bottom, middle, and top sheets, respectively, for purposes of identification only, and it is to be understood that a stack of these sheets may be oriented in any desired position within a utilization device. Each of the sheets 10, 12 and 14 comprises insulating material 11, such as alumina, or any other suitable insulating material, preferably a fusible ceramic material. The bottom sheet 10 has an electrically conductive film 16 on the lower surface of the ceramic. The film 16 may be applied to the insulating material 11 by deposition of a metal in a vacuum, or by painting the surface of the material 11 with electrically conductive, "fire-on" paint, or by any other suitable method known in the art. The upper surface of the sheet 10 comprises a plurality of substantially parallel, electrically conductive, regularly spaced lines 18. The lines 18 are deposited on the insulating material 11 by any of the methods heretofore described. Each of the lines 18 forms, with the film 16, a transmission line of a desired characteristic impedance. Since circuits along the lines 18 will tend to load the lines 18, the lines 18 may be tapered, as shown in FIG. 1, to cause each circuit to receive the same amount of energy from an input pulse.

The sheet 12 has an electrically conductive film 20 deposited on the upper surface of the insulating material 11. The sheet 12 and its film 20 are formed with a plurality of substantially parallel, regularly spaced through slots 22 that extend in a direction which is transverse, that is, substantially at right angles, to the direction of the lines 18.

The sheet 14 is also formed with a plurality of slots 24 similar to the slots 22 in the sheet 12. The slots 24 are adapted to be in communicative alignment with slots 22 when the sheets 10, 12 and 14 are joined together, as by fusing. In the fused condition, portions of the lines 18 on the sheet 10 should be accessible through the aligned slots 22 and 24, for the purpose hereinafter set forth.

The sheet 14 has a plurality of electrically conductive, regularly spaced, substantially parallel lines 26 applied to its upper surface. The lines 26 are applied to the insulating material 11 by any of the aforementioned methods, and each line 26, except the two end lines, is disposed between adjacent slots 24. Each of the lines 26 forms, with the conductive film 20, a transmission line of a desired characteristic impedance when the sheets 10, 12 and 14 are stacked closely or fused to each other. The lines 26 may also be tapered like the lines 18 for the reason given above.

The sheets 10, 12 and 14 are superimposed on each other in a stack and stuck together, preferably by fusing, so as to form a single, substantially planar wafer. It will now be understood that electrical components can be inserted within the aligned slots 24 and 22 in a manner whereby these components make electrical contact with the lines 18 and the lines 26, as is necessary in many random access storage devices employing X and Y address lines. Thus, the lines 18 may be considered as the X address lines, and the lines 26 may be considered as the Y address lines.

Figure 3:
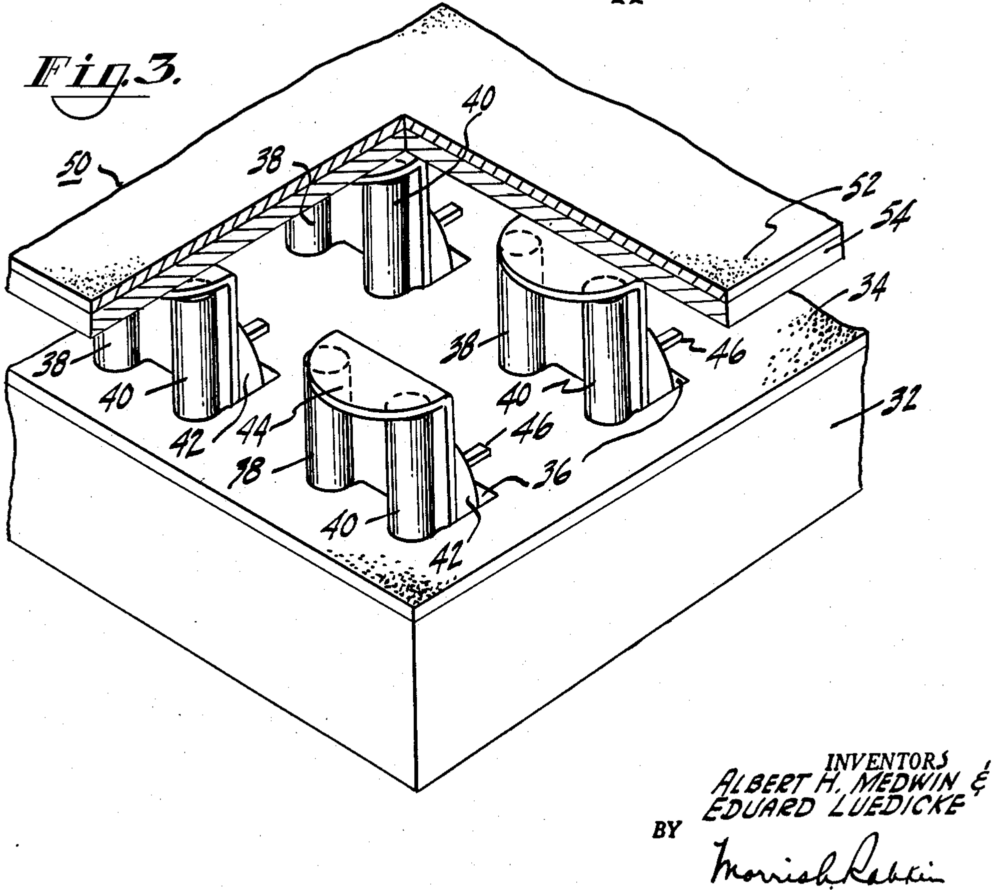
FIG. 3 is a perspective, fragmentary, enlarged view of the component-positioning sheet of the modular structure illustrated in FIG. 1, showing components positioned therein, and an output sheet capacitively coupled to some of the components, all in accordance with the present invention.

A component-positioning sheet 30 is disposed over the stack of sheets 10, 12 and 14 for the purpose of positioning and retaining components in contact with the transmission lines. To this end, the sheet 30 comprises a sheet of insulating material 32 having an upper surface coated with an electrically conductive film 34. The sheet 30 is formed with a plurality of through openings 36 similar to each other, as shown in FIG. 3. Though only one through opening 36 is shown in FIG. 1, for the sake of simplicity and clarity, it will be understood that the sheet 30 is formed with a plurality of openings 36, giving the sheet 30 a honeycombed appearance. The exact shape of the openings 36 is determined by the shape of the components to be positioned therein. When the sheet 30 is superimposed on the sheet 14, portions of the lines 26 and 18 are exposed by and are accessible through each of the openings 36 in the sheet 30, as shown in FIG. 4. These exposed portions are address points to which components may be easily connected.

A plurality of components are disposed within each of the openings 36 and the adjacent communicating slots 24 and 22 annd connected to the lines 18 and 26 to form a modular structure. In a modular structure of the type described, the components in each of the openings 36 are connected in a similar manner. The connections of the components in only one opening 36 will, therefore, be described. A relatively long, rod-type resistor 38 is inserted vertically through the opening 36 and the aligned slots 24 and 22 so that its lower end makes electrical contact with a line 18 on the sheet 10. The resistor 38 may be electrically connected permanently to an address point on the line 18 by any suitable means, as, for example, by means of conductive epoxy material. A relatively shorter resistor 40 is also inserted vertically through the opening 36 until its lower end makes electrical contact with one of the lines 26. The resistor 40 may also be fixed to the line 26 by conductive epoxy material.

When the resistors 38 and 40 are connected to the lines 18 and 26, respectively, the upper ends of these resistors project the same distance above the sheet 30. A tunnel diode 42 can now be inserted also within the opening 36. An angularly-formed anode terminal 44 of the diode 42 is conductively connected to the upper ends of both of the resistors 38 and 40. The cathode terminal 46 of the tunnel diode 42 is connected to the film 34 on the sheet 30, as shown in FIG. 3.

An output sheet 50 may be superimposed over the anode terminals 44 of the tunnel diode 42 to provide a capacitive output coupling for the circuitry of the modular structure. To this end, each of the terminals 44 is disposed the same distance above the component-positioning sheet 30. The sheet 50 comprises an electrically conductive film 52 on the upper surface of a sheet of insulating material 54. The conductive film 52 forms a separate capacitor with each of the anode terminals 44. The sheet 50 may be held in a fixed position with respect to the stack of sheets 10, 12 and 14 and the sheet 30 by any suitable means, such as a frame (not shown). The conductive films 16, 20 and 34 may be connected together to form a common ground connection.

Referring now to FIG. 5, there is shown a portion of the schematic diagram of the random access storage device described and illustrated as a modular structure in FIGS. 1 to 4. The reference numerals that were used for the components of the modular structure are used also for the corresponding symbols in FIG. 5, but each symbol is designated, in addition, by the reference letter "*a*" to distinguish the component symbol from the actual component. It will be understood also that the circuitry of FIG. 5 is representative of one embodiment of the random access storage circuit utilizing X and Y address lines of the transmission line type. Since other circuits are possible, this embodiment should be considered as illustrative, and not in a limiting sense.

The operation of the circuitry illustrated in FIG. 5 will now be described. Let it be assumed that the tunnel diodes 42*a* are of the type that can be switched from a low voltage state to a high voltage state by means of a current pulse of a predetermined switching amplitude, in a manner well known in the art. If pulses of an amplitude smaller than the switching amplitude and at least one-half of the switching amplitude are applied to one X address line, say $X_1$ (line 18*a*), and to one Y address line, say $Y_1$ (line 26*a*), the tunnel diode $42a_{11}$ electrically connected to these address lines will be switched from its low voltage state to its high voltage state. An output may be derived through the capacitor 52*a* connected to the anode of this diode $42a_{11}$. It will be noted that two pulses, each of at least one-half the required switching amplitude, must arrive substantially simultaneously at a tunnel diode in order to switch it. Thus, if only one current pulse of one-half of the switching amplitude is applied to any tunnel diode, via only one address line, the tunnel diode will not be switched. When one considers that one cycle of current at a frequency of 1000 mc. per second travels about four inches in one nanosecond, one can appreciate the importance of maintaining the length of address lines within prescribed limits in order to prevent unwanted phase shifts in signal pulses, so as not to interfere with the proper operation of the circuitry. The tunnel diodes may be switched from a high voltage state to a low voltage state by two signals of an opposite polarity to the aforementioned signals. The amplitude of these signals, except for polarity, should be substantially the same also.

From the foregoing description, it will be apparent that there have been provided novel modular structures employing two sets of address lines and means for easily connecting components to address points on these address lines. While modular structures for only one random access storage device have been shown and described, variations of the modular structures, and circuitry embodied therein, coming within the spirit of this invention will, no doubt, readily suggest themselves to those skilled in the art. Hence, it is desired that the foregoing description shall be considered as illustrative and not in a limiting sense.

What is claimed is:

1. A modular structure for a random access storage device comprising a first sheet of insulating material having an electrically conductive film on one side thereof and a first plurality of electrically conductive, substantially parallel lines on the other side thereof, a second sheet of insulating material having one side disposed over said lines of said first sheet, said second sheet having an electrically conductive film on the other side thereof and being formed with a plurality of substantially parallel slots disposed transversely to said lines, a third sheet of insulating material having one side disposed over said film on said second sheet, said third sheet also being formed with a plurality of slots substantially similar to and in communicative alignment with said slots in said second sheet, said third sheet having a plurality of electrically conductive, substantially parallel lines on the other side thereof, each of said second plurality of lines and said film of said second sheet forming a transmission line of a predetermined characteristic impedance, each of said first plurality of lines forming with said film on said first sheet a transmission line of said characteristic impedance, each of said lines on said first sheet being exposed through said slots in said second and third sheets, whereby circuit components may be connected thereto, a component-positioning sheet disposed over said third sheet and being formed with a plurality of openings each exposing portions of said first and said second plurality of lines, said component-positioning sheet having a side remote from said third sheet comprising insulating material and the opposite side thereof comprising an electrically conductive film, two resistors and a tunnel diode disposed within each of said openings, one end of one of said two resistors in each of said openings contacting a line of said first plurality of lines, one end of the other of said two resistors in each of said openings contacting a line in said second plurality of lines, each of said tunnel diodes having an anode terminal and a cathode terminal, the other ends of said resistors in each of said openings contacting said anode terminals of the respective said tunnel diodes, the cathode terminal of said tunnel diode in each of said openings contacting said film on said component-positioning sheet, and an output sheet disposed over said anode terminals of all of said tunnel diodes, said output sheet having one side of insulating material in contact with said anode terminals and the other side of electrically conductive material forming a capacitive coupling with said anode terminals.

2. A modular structure for a random access storage device comprising a first sheet of insulating material having an electrically conductive film on one side thereof and a first plurality of electrically conductive, regularly spaced lines on the other side thereof, a second sheet of insulating material having one side disposed over said lines on said first sheet, said second sheet having an electrically conductive film on the other side thereof and being formed with a plurality of regularly spaced slots disposed transversely to said lines, a third sheet of insulating material having one side disposed over said film on said second sheet, said third sheet being formed also with a plurality of slots substantially similar to and in communicative alignment with said slots in said second sheet, said third sheet having a plurality of electrically conductive, regularly spaced lines on the other side thereof, each of said second plurality of lines and said film on said second sheet forming a transmission line, each of said first plurality of lines forming with said film on said first sheet a transmission line, each of said lines on said first sheet being exposed through said slots in said second and third sheets, whereby components may be accessible thereto, a component-positioning sheet disposed over said third sheet and being formed with a plurality of openings each exposing portions of said first and said second plurality of lines, components disposed within said openings and said slots, portions of said components extending equal distances from said component-positioning sheet, and an output sheet having one side comprising insulating material disposed over said portions of said components and the other side comprising an electrically conductive film forming a capactive coupling with said portions of said components.

3. A modular structure for a random access storage device comprising a first sheet of insulating material having an electrically conductive film on one side thereof and a first plurality of electrically conductive, substantially parallel, regularly spaced lines on the other side thereof, a second sheet of insulating material having one side disposed over said lines on said first sheet, said second sheet having an electrically conductive film on the other side thereof and being formed with a plurality of substantially parallel, regularly spaced slots disposed transversely to said lines, a third sheet of insulating material having one side disposed over said film on said second sheet, said third sheet also being formed with a plurality of slots substantially similar to and in communicative alignment with said slots in said second sheet, said third sheet having a plurality of electrically conductive, substantially parallel, regularly spaced lines on the other side thereof, each of said second plurality of lines and said film on said second sheet forming a transmission line, each of said first plurality of lines forming with said film on said first sheet a transmission line, each of said lines on said first sheet being exposed through said slots in said second and third sheets, whereby components may be accessible thereto, and a component-positioning sheet disposed over said third sheet and being formed with a plurality of openings each exposing portions of said first and said second plurality of lines, whereby said components may be connected thereto.

4. A modular structure comprising a first sheet of insulating material having an electrically conductive film on one side thereof and a first plurality of electrically conductive, substantially parallel, regularly spaced lines on the other side thereof, a second sheet of insulating material having one side disposed over said lines of said first sheet, said second sheet having an electrically conductive film on the other side thereof and being formed with a plurality of substantially parallel, regularly spaced slots disposed transversely to said lines, and a third sheet of insulating material having one side disposed over said film on said second sheet, said third sheet also being formed with a plurality of slots substantially similar to and in communicative alignment with said slots in said second sheet, said third sheet having a second plurality of electrically conductive, substantially parallel, regularly spaced lines on the other side thereof, each of said second plurality of lines and said film of said second sheet forming a transmission line, each of said first plurality of lines forming with said film on said first sheet a transmission line, and portions of each of said lines on said first sheet being exposed through said slots in said second and third sheets, whereby components may be connected thereto.

5. A modular structure for two sets of transmission lines, said modular structure comprising a stack of three sheets of insulating material, the bottom sheet of said stack having an electrically conductive film on one surface thereof, a plurality of substantially parallel, electrically conductive lines between said bottom sheet and the middle sheet of said stack, each of said lines forming with said film a transmission line, the top sheet and said middle sheet being formed with a plurality of aligned slots exposing portions of said lines, an electrically conductive film between said middle and top sheets, and a plurality of electrically conductive, substantially parallel lines on the upper surface of said top sheet, each of said last-mentioned plurality of lines forming with said last mentioned film a transmission line.

6. A modular structure comprising a stack of three ceramic sheets fused together to form a single planar wafer, the bottom sheet of said stack having an electrically conductive film on the bottom surface thereof, a first plurality of substantially parallel, electrically conductive lines between said bottom sheet and the middle sheet of said stack, each of said lines forming with said film a transmission line, the top sheet of said stack and said middle sheet being formed with a plurality of aligned slots exposing portions of said first plurality of lines, an electrically conductive film between said middle and said top sheets, a second plurality of electrically conductive, substantially parallel lines on the upper surface of said top sheet, each of said second plurality of lines forming with said last-mentioned film a transmission line, and a component-positioning sheet disposed over said stack, said component-positioning sheet being formed with a plurality of openings each communicating with certain ones of said slots and exposing portions of said lines therethrough, whereby said components may be electrically connected to said lines.

References Cited in the file of this patent

UNITED STATES PATENTS

| | | |
|---|---|---|
| 2,872,664 | Minot | Feb. 3, 1959 |
| 3,011,156 | MacPherson | Nov. 28, 1961 |
| 3,017,613 | Miller | Jan. 16, 1962 |
| 3,098,997 | Means | July 23, 1963 |

FOREIGN PATENTS

| | | |
|---|---|---|
| 734,004 | Great Britain | July 20, 1955 |